US012645897B2

(12) United States Patent
Parthiban

(10) Patent No.: US 12,645,897 B2
(45) Date of Patent: Jun. 2, 2026

(54) RFID ANTENNA AND AN RFID READER ENCLOSURE AND SYSTEM

(71) Applicant: Times-7 Research Limited, Lower Hutt (NZ)

(72) Inventor: Prabakar Parthiban, Upper Hutt (NZ)

(73) Assignee: Times-7 Research Limited, Lower Hutt (NZ)

( * ) Notice: Subject to any disclaimer, the term of this patent is extended or adjusted under 35 U.S.C. 154(b) by 196 days.

(21) Appl. No.: 18/548,040

(22) PCT Filed: Mar. 2, 2021

(86) PCT No.: PCT/NZ2021/050033
§ 371 (c)(1),
(2) Date: Aug. 25, 2023

(87) PCT Pub. No.: WO2022/186703
PCT Pub. Date: Sep. 9, 2022

(65) Prior Publication Data
US 2024/0135120 A1    Apr. 25, 2024
US 2024/0232551 A9    Jul. 11, 2024

(51) Int. Cl.
*G06K 7/10*        (2006.01)
*H01Q 21/06*        (2006.01)
(52) U.S. Cl.
CPC ....... *G06K 7/10356* (2013.01); *H01Q 21/065* (2013.01)
(58) Field of Classification Search
CPC .......... G06K 7/10356; G06K 7/10316; G06K 19/0723; H01Q 21/065; H01Q 1/2216;
(Continued)

(56) References Cited

U.S. PATENT DOCUMENTS 8,604,981 B2    12/2013    Ehlen
9,929,886 B2    3/2018    Amadjikpe et al.
(Continued)

FOREIGN PATENT DOCUMENTS

CN    201528054 U    7/2010
CN    203415691 U    1/2014
(Continued)

OTHER PUBLICATIONS

Extended and Supplementary European Search Report issued in the corresponding European Patent Application No. 21929327.1, Feb. 19, 2024.
(Continued)

*Primary Examiner* — Seung H Lee
(74) *Attorney, Agent, or Firm* — Merchant & Gould P.C.

(57) ABSTRACT

An RFID reader system including a novel antenna and enclosure. The enclosure moves between open and closed configurations and in the open configuration the interior is accessible from a number of sides to facilitate placement or removal of items to be scanned from the volume. The antenna may have an array of radiating elements with phase delays between them and a plurality of feeds configured to produces tilted beams of different polarisation. The antenna may have three or more feeds producing three or more beams having different polarisations. Some radiating elements may be arranged in one or more asymmetric group and the groups may be driven with different polarisations. The antenna feeds may be sequentially driven to cause the beam of the antenna to scan.

19 Claims, 4 Drawing Sheets

(58) Field of Classification Search
CPC ........ H01Q 21/24; H01Q 21/28; H01Q 25/00; H01Q 21/061; H01Q 21/12; H01Q 21/22
See application file for complete search history.

(56) References Cited

U.S. PATENT DOCUMENTS

| | | | |
|---|---|---|---|
| 2007/0279286 A1* | 12/2007 | Coutts ................. | H01Q 9/0442 |
| | | | 343/700 MS |
| 2010/0283687 A1 | 11/2010 | Ehelen | |
| 2017/0310017 A1 | 10/2017 | Howard | |
| 2017/0372101 A1 | 12/2017 | Suzuki et al. | |
| 2019/0286861 A1 | 9/2019 | Suzuki et al. | |
| 2020/0028255 A1 | 1/2020 | Kuhn et al. | |

FOREIGN PATENT DOCUMENTS

| | | | |
|---|---|---|---|
| EP | 3 454 309 A1 | 3/2019 | |
| WO | 2020/218927 A1 | 10/2020 | |

OTHER PUBLICATIONS

Karabey, H.O., "Electronic Beam Steering and Polarization Agile Planar Antennas in Liquid Crystal Technology", Springer International Publishing, Switzerland (2014).

Sánchez-Barbetty, M. et al., "Interleaved Sparse Arrays for Polarization Control of Electronically Steered Phased Arrays for Meteorological Applications", IEEE Transactions on Geoscience and Remote Sensing, vol. 50, No. 4: 1285-1288 (2012).

Simeoni, M. et al., "Interleaving Sparse Arrays: a New Way to Polarization-Agile Array Antennas?", IEEE Antennas and Propagation Society International Symposium: 3145-3148 (2007).

Parthiban, P. et al., "Low-cost low-profile UHF RFID reader antenna with reconfigurable beams and polarizations", 2017 IEEE International Conference on RFID (RFID): 81-87 (2017).

International Search Report and Written Opinion for PCT/NZ2021/050033 (May 28, 2021).

International Preliminary Report on Patentability for PCT/NZ2021/050033 (Mar. 27, 2027).

* cited by examiner

4

9

8

7

RFID ANTENNA AND AN RFID READER ENCLOSURE AND SYSTEM

This application is a National Stage Application of PCT/NZ2021/050033, filed Mar. 2, 2021, which application is incorporated herein by reference. To the extent appropriate, a claim of priority is made to the above disclosed application.

FIELD OF THE DISCLOSURE

The present disclosure relates to an RFID (radio-frequency identification) antenna suitable for identifying large numbers of RFID tags and an RFID tag reading system and enclosure.

BACKGROUND

RFID tags may be read using a single multi-patch array antenna. These are relatively low cost and compact but cannot provide acceptable performance when reading large numbers of tags disposed in a variety of orientations.

RFID tag reading tunnels are currently the most reliable RFID reader systems for reading large numbers of tags disposed in a variety of orientations. Such tunnel systems typically employ multiple circularly polarised antennas in different planes (e.g. top, bottom and sides) with items transported through the tunnel on a moving belt. These are large, complex and very expensive.

SUMMARY

There is a need for a low cost and compact RFID tag reading system that is capable of reliably reading a large number of RFID tags disposed in a variety of orientations.

It is desirable for any new design to be simple, compact, inexpensive, reliable and easy to use.

The present disclosure provides examples of an RFID antenna comprising an array of radiating elements having phase delay elements between radiating elements and a plurality of feeds to the antenna array configured such that, when each feed is driven, the antenna produces tilted beams of different polarisation.

In some configurations the same radiating elements can be configured to produce both beams.

In some configurations the array of radiating elements is a regular array.

In some configurations phase delay elements can be provided by feed elements between adjacent radiating elements.

In some configurations phase delay elements can be provided between uppermost and lowermost radiating elements to produce vertical beam polarisation.

In some configurations phase delay elements can be provided between leftmost and rightmost radiating elements to produce horizontal beam polarisation.

In some configurations four radiating elements can be provided in a regular square array.

In some configurations the radiating elements can be patch antennas.

The present disclosure also provides examples of an RFID antenna comprising an array of radiating elements having three or more feeds to the antenna wherein each feed is configured so that, when driven, the antenna produces a tilted beam having a different polarization to the polarizations of the beams produced when the other feeds are driven.

In some configurations the different polarisations can be selected from horizontal, vertical and slant polarisations.

In some configurations the different polarisations can be horizontal, vertical and two different slant polarisations.

In some configurations a first feed is configured to drive a first group of radiating elements with a first polarisation and a second group of radiating elements with a different polarisation to produce a beam having a first slant polarisation.

In some configurations a second feed is configured to drive the second group of radiating elements with the first polarisation and the first group of radiating elements with a different polarisation to produce a beam having a second slant polarisation, different to the first slant polarisation.

In some configurations the first and second group of radiating elements can surround a third group of radiating elements.

In some configurations feed delay elements between can be provided between radiating elements to produce beam tilt.

The present disclosure also provides examples of an RFID antenna comprising an array of radiating elements having a feed network to the antenna array configured so that, when driven, an asymmetric arrangement of a first group of radiating elements is driven with a first polarisation and a second group of radiating elements is driven with a second polarisation, different to the first polarisation.

In some configurations the second group of radiating elements can be arranged in an asymmetric arrangement.

In some configurations each arrangement can be generally L shaped.

In some configurations phase delay elements can be provided in feeds between radiating elements to produce beam tilt.

In some configurations the beam tilt of the first group of radiating elements is between 15° to 25° with respect to the vertical.

In some configurations the beam tilt of the first group of radiating elements is about 20° with respect to the vertical.

In some configurations both groups can be alternately driven to produce beams having different polarisations.

In some configurations the radiating elements of one group of radiating elements are driven to produce vertical polarisation and the those of the other group are driven to produce horizontal polarisation.

In some configurations the first and second groups of radiating elements produce a far field beam having a slant polarisation of between 15 to 45 degrees to the vertical.

In some configurations the slant polarisation is between 35 to 45 degrees.

The present disclosure also provides examples of an RFID reader system comprising: an RFID reader having a plurality of ports for driving antenna elements; and a first array of radiating elements driven by a first port of the RFID reader wherein a phase delay element is provided between each radiating element; and a second array of radiating elements driven by a second port of the RFID reader wherein a phase delay element is provided between each radiating element.

The present disclosure also provides examples of a method of driving an RFID antenna consisting of a plurality of radiating elements driven by a feed network including phase delay elements between at least some radiating elements, the method comprising sequentially driving and not driving the RFID antenna so as to cause the beam of the antenna to scan.

The present disclosure also provides examples of an enclosure for an RFID reader comprising: a base including an RFID antenna; and a hood having a surface that is reflective to RF radiation that is movable between: a first position in which the hood and the base enclose a volume to be scanned; and a second position in which the volume is accessible from a plurality of sides to facilitate placement or removal of items to be scanned from the volume.

In some configurations the volume can be accessible from three or more sides.

In some configurations the volume can be accessible from the front, left and right sides.

In some configurations the hood can rotate between the first and second positions.

In some configurations the hood can lift as it rotates between the first and second positions.

In some configurations the hood can include a hinge that retains the hood in the second position.

In some configurations an actuator can be provided for moving the hood between the first and second positions.

In some configurations a base reflective sheet that is reflective to RF radiation can be provided.

In some configurations the antenna extends upwardly from the reflective base sheet.

BRIEF DESCRIPTION OF THE DRAWINGS

These and other features, aspects, and advantages of the present disclosure are described with reference to the drawings of certain embodiments, which are intended to schematically illustrate certain embodiments and not to limit the disclosure.

DETAILED DESCRIPTION

Where reference is made to RFID tag reading it is to be appreciated that this encompasses RFID tag writing too. Although certain embodiments and examples are described below, those of skill in the art will appreciate that the disclosure extends beyond the specifically disclosed embodiments and/or uses and obvious modifications and equivalents thereof. Thus, it is intended that the scope of the disclosure herein disclosed should not be limited by any particular embodiments described below.

Example RFID Tag Reading Station

Figure 1:
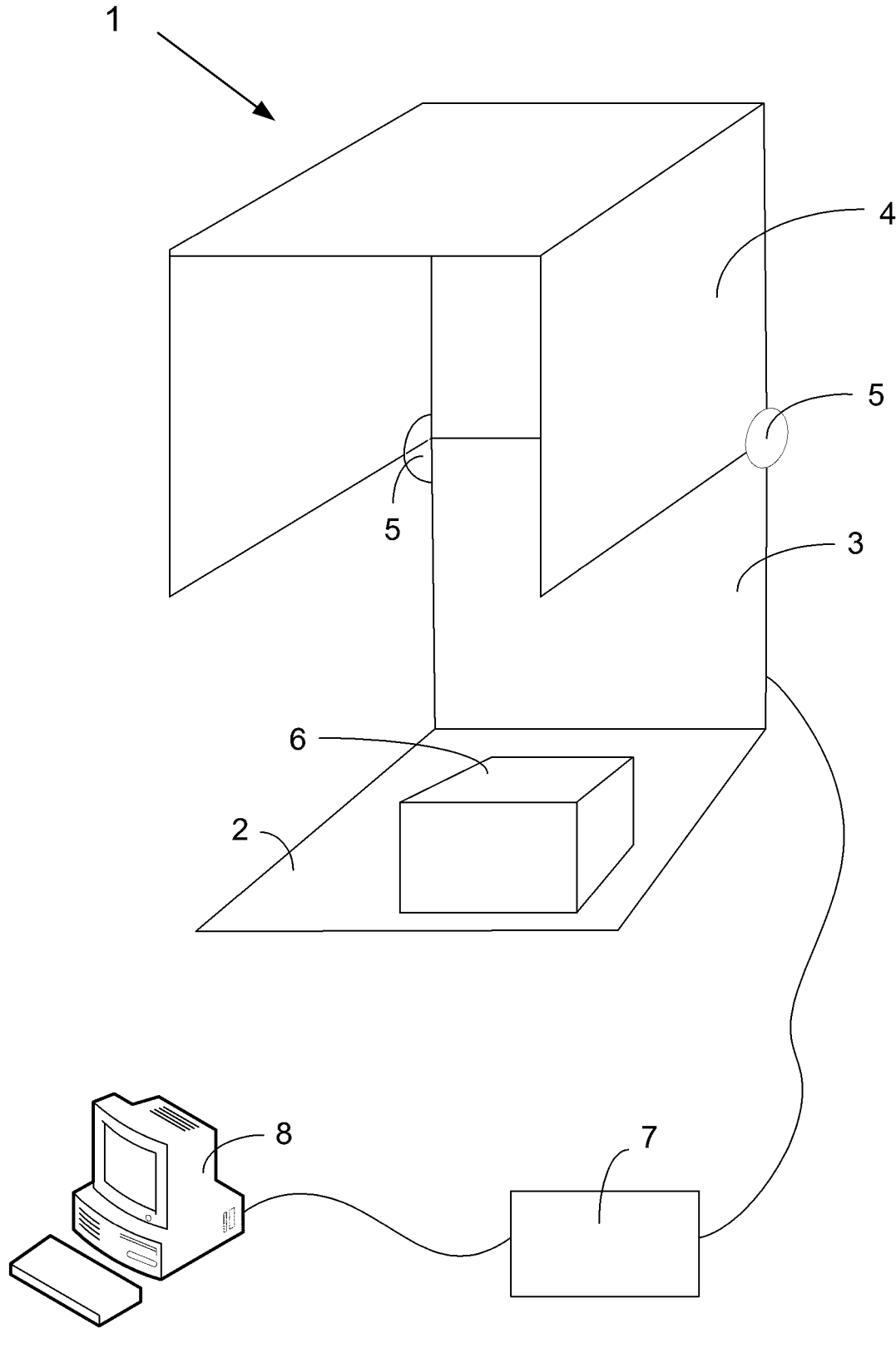
FIG. 1 shows an example RFID reading station with a hood of an enclosure raised to allow packages to be placed for reading.

FIG. 1 shows an exemplary RFID tag reading station including an enclosure 1 comprising a reflective base sheet 2 connected to an antenna 3 with a hood 4 pivotally mounted to the antenna 3 by hinges 5. The hood 4 may be formed conductive or non-conductive sheets reflective to RF radiation produced by antenna 3. Conductive metal sheets, metal mesh or metal foils, such as aluminum, copper, tin, brass, steel, etc. may be used. Alternatively, or additionally non-conductive but RF reflective sheets such as mylar, metallized plastics, etc. may be used. Both conductive and non-conductive sheets can be attached to a protective fabric or plastic or foam can be used to enhance the hood's durability. The distance between sides of the hood may preferably be between one to three wavelengths (at the frequency of operation of the antenna 3) and more preferably about two wavelengths for reasons described below.

Figure 2:
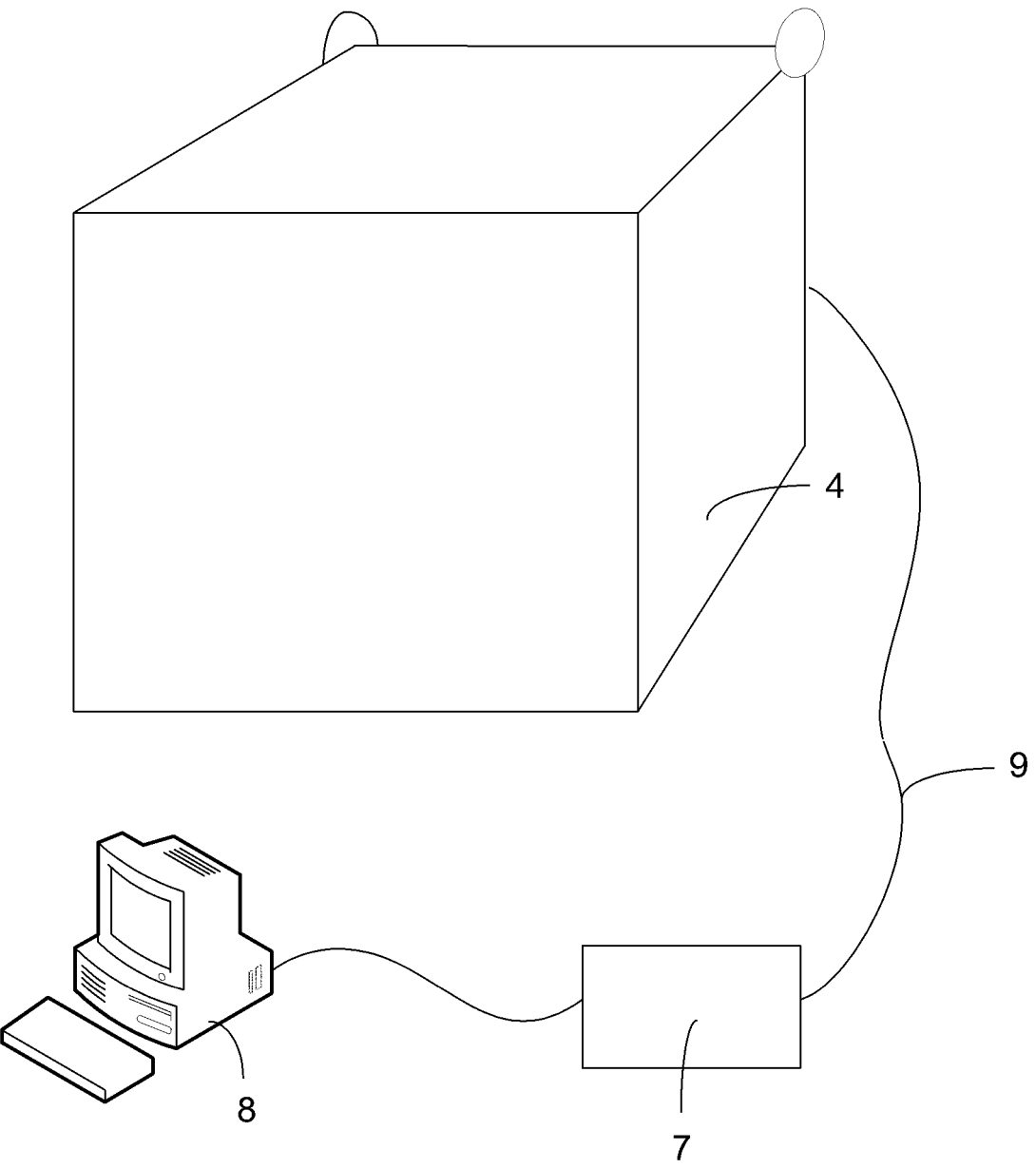
FIG. 2 shows the example enclosure of FIG. 1 with the hood closed.

In use a box 6 containing items having associated RFID tags may be placed on base 2 and the hood 4 rotated about hinges 5 to close enclose the (as shown in FIG. 2). A reader 7 may then drive antenna 3 so that the tags may be read and supply the read tag data to a computing or storage device, shown by an exemplary computer 8 in this case. Whilst only reading is referred to in this example it is to be appreciated that the tags may also be written to. The reader 7 may be incorporated into antenna 3. Reader 7 may require a sensor to indicate that the enclosure is closed before the antenna 3 is driven.

The enclosure design allows easy placement and removal of items to be read (in the open FIG. 1 configuration) as access is provided from a plurality of sides, in this case three, unlike designs allowing access from only one side. The hinges 5 may include a locking mechanism or be sprung so that the hood remains supported in the elevated position when raised.

Whilst this is a very effective design there are a range of alternative designs that could be employed. One alternative enclosure design would allow hood 4 to be vertically raised and lowered, for example on vertical guide rails. Another possible arrangement could allow hood 4 to rotate about a vertical axis, for example a semi-cylindrical hood rotating with respect to base 2 and antenna 3. These designs could all be automated, for example using a geared motor to move the hood between open and closed configurations. The hood could be any of a range of shapes including a partial cuboid, other partial polyhedron, partial ellipsoid or partial tetrahedral.

Example Antenna

Figure 3:
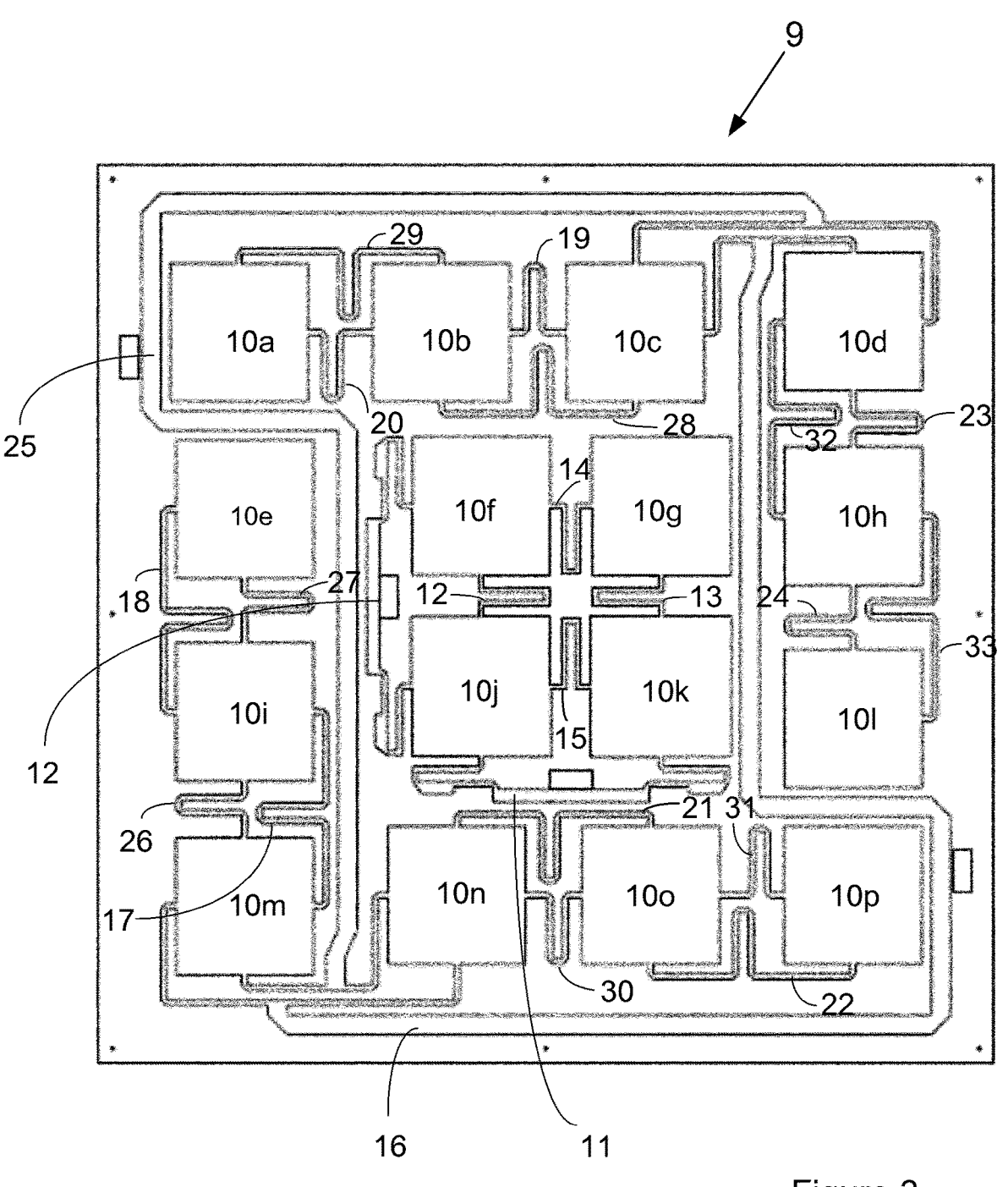
FIG. 3 shows an example RFID antenna.

FIG. 3 shows an example antenna 9 suitable for use in the above example RFID tag reading station but also in other applications. Whilst an example patch antenna configuration is shown in FIG. 3 it will be apparent from the description below that other configurations may be employed using all or part of the design.

An antenna is said to be vertically polarised (linear) when its electric field (antenna beam) is perpendicular to the Earth's surface. Horizontally polarised (linear) antennas have their electric field (antenna beam) parallel to the Earth's surface. Antenna beams at other angles are referred to as having slant polarisation (i.e. between vertical and horizontal). Where an antenna has multiple radiating elements, such as a patch antenna array, near field radiation may have different polarisations to far field radiation where all components have combined. Antenna beams may also be tilted within a plane of polarisation at an angle to a normal direction of propagation (i.e. perpendicular to a panel antenna).

The example antenna shown in FIG. 3 includes sixteen radiating elements in the form of patches 10a to 10p arranged in a rectangular array. This is a non-limiting example and other numbers and arrangements of radiating elements may be employed. Four feeds are provided in this example which are arranged to drive the antenna so as to produce beams having different polarisations but other numbers of feeds can be employed. Beam tilt can be achieved by adjusting delay lines between antennas in a driven group. It will be appreciated that the number of beam polarisations employed and the tilt of each beam may be selected for a particular application. It will also be appreciated that different feed network topologies may be employed using different serial or parallel feed configurations.

Figure 4:
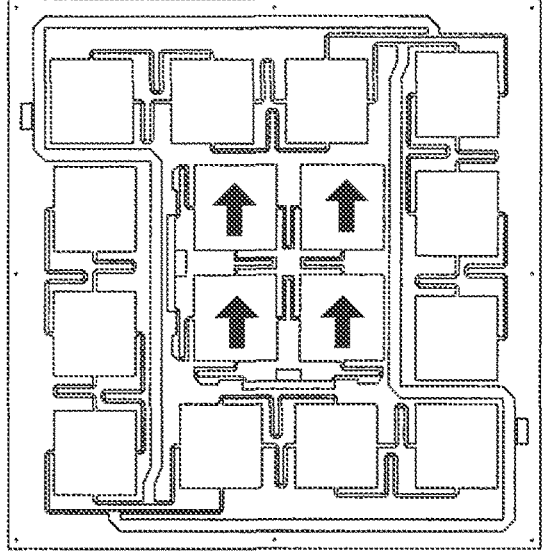
FIG. 4 shows the example antenna of FIG. 3 when driven in a first mode.

A first feed 11 drives the bases of patches lOj and 10k with delay lines 12 and 13 feeding patches lOf and lOg so as to drive these patches with vertical polarisation as illustrated by the arrows in FIG. 4.

Figure 5:
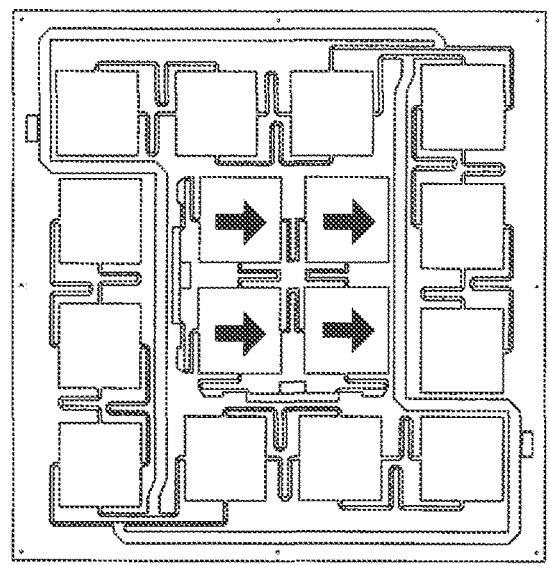
FIG. 5 shows the example antenna of FIG. 3 when driven in a second mode.

A second feed 12 drives the sides of patches lOf and lOj with delay lines 14 and 15 feeding patches lOg and 10k so as to drive these patches with horizontal polarisation as illustrated by the arrows in FIG. 5.

Figure 6:
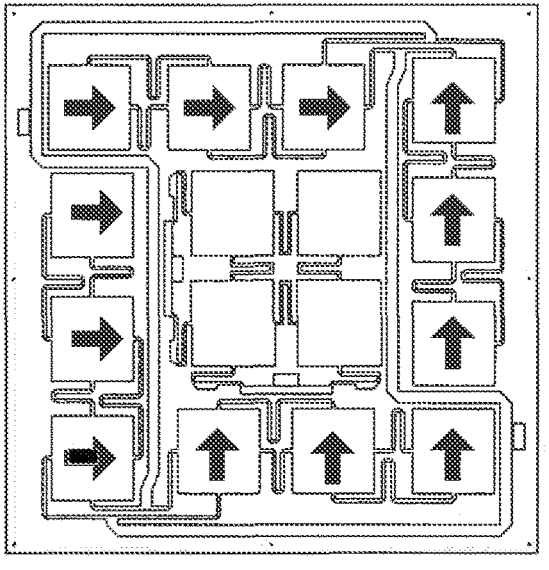
FIG. 6 shows the example antenna of FIG. 3 when driven in a third mode.

A third feed 16 drives the left side of patch 10m which in turn drives patches lOi and lOe via delay lines 17 and 18 so as to drive these patches with horizontal polarisation as illustrated by the arrows in FIG. 6. Third feed 16 also drives the right side of patch 10c which in turn drives patches 10b and 10a via delay lines 19 and 20 so as to drive these patches with horizontal polarisation as illustrated by the arrows in FIG. 6. Third feed 16 also drives the lower side of patch 10h which in turn drives patches 10o and lOp via delay lines 21 and 22 so as to drive these patches with vertical polarisation as illustrated by the arrows in FIG. 6. Third feed 16 also drives the upper side of patch lOd which in turn drives patches lOh and 101 via delay lines 23 and 24 so as to drive these patches with vertical polarisation as illustrated by the arrows in FIG. 6.

Figure 7:
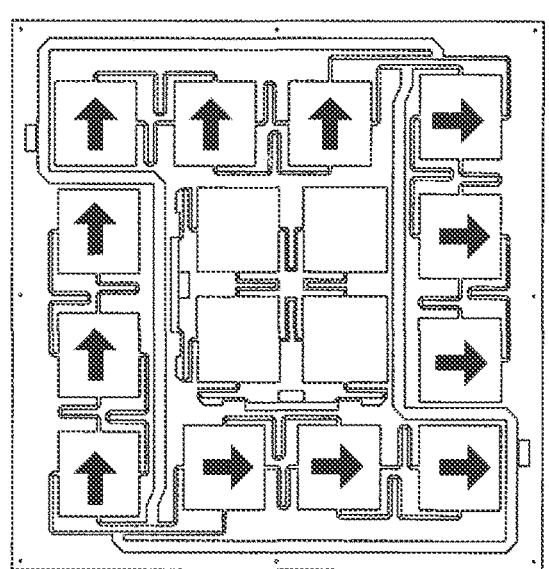
FIG. 7 shows the example antenna of FIG. 3 when driven in a fourth mode.

A fourth feed 25 drives the bottom of patch 10m which in turn drives patches lOi and lOe via delay lines 26 and 27 so as to drive these patches with vertical polarisation as illustrated by the arrows in FIG. 7. Fourth feed 25 also drives the top side of patch 10c which in turn drives patches 10b and 10a via delay lines 28 and 29 so as to drive these patches with vertical polarisation as illustrated by the arrows in FIG. 7. Fourth feed 25 also drives the left side of patch 10h which in turn drives patches 10o and 10p via delay lines 30 and 31 so as to drive these patches with horizontal polarisation as illustrated by the arrows in FIG. 7. Fourth feed 25 also drives the right side of patch lOd which in turn drives patches lOh and 101 via delay lines 32 and 33 so as to drive these patches with vertical polarisation as illustrated by the arrows in FIG. 7.

As will be seen in FIG. 6 when the third feed is driven a first L shaped group of patches is driven with vertical polarisation and a second L shaped group of patches is driven with horizontal polatisation. The far field beam produced by the first and second groups can be designed to have a slant of between 15° to 45° with respect to vertical, preferably between 35° to 45° or another value in other applications. The propagated antenna beam may also be tilted by adjusting the delays between patches. In the present example the beam can be tilted down by about 15° to 25°, preferably about 20°.

As will be seen in FIG. 7 when the fourth feed is driven a first L shaped group of patches is driven with vertical polarisation and a second L shaped group of patches is driven with horizontal polatisation. It will be appreciated due to the symmetry that the composite beam will have the same polarisation (although opposite) and the same down tilt as described above in relation to FIG. 6.

The first and second L shaped groups in FIGS. 6 and 7 are asymmetric and the shape may be changed to alter the degree of slant of the polarisation of the far field propagated by each group of adiating elements. It will be appreciated that different degrees of slant and down tilt may be selected depending upon the specific application.

Whilst a patch antenna has been described in the example above it will be appreciated that different type of antennas and radiating elements may be employed, for example slot antennas could be used. The patch antenna may be manufactured in a variety of ways although the method disclosed in the applicant's U.S. Pat. No. 8,604,981 is one preferred method, the disclosure of which is incorporated herein by reference.

In use a package 6 containing items with RFID tags attached may be placed on base 2. There may be hundreds of RFID tags within package 6 disposed in a wide range of orientations. Flood 4 may then be lowered to the position shown in FIG. 2 so that the RF reflective material of hood 4 will reflect radiation generated by panel antenna 3.

Reader 7 in this example has 4 ports which drive the four feeds 11, 12, 16 and 25.

The four ports are driven sequentially so as to produce beams having vertical polarisation, horizontal polarisation and two different slant polarisations (one positive and one negative in this example). One or more beams may also be tilted (down tilt in this case, although it could be in either direction depending upon configuration and the shape of the hood).

The beams produced by the L shaped groups of radiating elements form over the near field (about one wavelength) and the transition zone (between one to two wavelengths) to form a far field beam based on the components of all radiating elements. This means that an RFID tag in the near field will experience a beam polarisation that is strongly based on the polarisation of one or more local radiating elements whereas closer to the far field the components will combine so that the composite beam reflects a polarisation due to the combination of all elements. This effectively results in beam polarisations experienced in the near field and transition zone appearing to twist from the pure polarisation of a single radiating element to composite polarisations of the combined beams. This effect has been found to enhance the efficacy of tag reading and writing.

The sequential switching on and off of the reader ports creates an antenna beam pattern that changes during energization and de-energisation phases which enhances RFID tag coupling. By providing a number of beams at varying polarisations and beam tilt a large number of RFID tags arranged with different orientations may be reliably read as at least one beam will have sufficient coupling with an RFID tag to provide a successful read. It will be appreciated that these specific polarisations need not be employed and a range of polarisations disposed at sufficient angles to each other may provide effective tag reading. For example, three polarisations Data read by antenna 3 and reader 7 may be supplied to a computer 8 or other data processing equipment.

The present disclosure provides examples of an RFID reading station that is simple, compact, light (about lOKg) and inexpensive whilst providing high read accuracy at a high read rate (1000 tags per second has been achieved). The antenna provides an even near-field energy distribution (due to 16 patches in a small footprint) that can read different types of assets (liquids, metals, plastic, wood, paper, etc.). The solution is easily deployed and is directly compatible with a standard four-port RAIN RFID reader. Antenna diversity also ensures reliable RFID tag reading and writing as even if one group of radiating elements is obscured (by metal for example) others may not be. Whilst the antenna design may be used advantageously in the present application it will be appreciated that example designs and variants applying the principles described may be employed in a wide range of fields.

It should be emphasized that many variations and modifications may be made to the embodiments described herein, the elements of which are to be understood as being among other acceptable examples. All such modifications and variations are intended to be included herein within the scope of this disclosure and protected by the following claims. Further, nothing in the foregoing disclosure is intended to imply that any particular component, characteristic or process step is necessary or essential.

What is claimed is:

1. An RFID antenna comprising an array of radiating elements having phase delay elements between radiating elements and a plurality of feeds to the antenna array configured such that, when each feed is driven, the antenna simultaneously produces tilted beams of different polarization.

2. The RFID antenna as claimed in claim 1 wherein the same radiating elements produce all beams.

3. The RFID antenna as claimed in claim 1 wherein the array of radiating elements is a regular array.

4. The RFID antenna as claimed in claim 1 wherein phase delay elements are provided between adjacent radiating elements.

5. The RFID antenna as claimed in claim 4 wherein phase delay elements are provided between uppermost and lowermost radiating elements to produce vertical beam polarization.

6. The RFID antenna as claimed in claim 4 wherein phase delay elements are provided between leftmost and rightmost radiating elements to produce horizontal beam polarization.

7. An RFID antenna comprising an array of radiating elements having three or more feeds to the antenna wherein each feed is configured so that, when driven, the antenna simultaneously produces a tilted beam having a different polarization to the polarizations of the beams produced when the other feeds are driven.

8. The RFID antenna as claimed in claim 7 wherein the different polarizations are selected from horizontal, vertical and slant polarizations.

9. The RFID antenna as claimed in claim 8 wherein the different polarizations comprise horizontal, vertical and two different slant polarizations.

10. The RFID antenna as claimed in claim 7 wherein a first feed is configured to drive a first group of radiating elements with a first polarization and a second group of radiating elements with a different polarization to produce a beam having a first slant polarization.

11. The RFID antenna as claimed in claim 10 wherein a second feed is configured to drive the second group of radiating elements with the first polarization and the first group of radiating elements with a different polarization to produce a beam having a second slant polarization, different to the first slant polarization.

12. The RFID antenna as claimed in claim 11 wherein the first and second groups of radiating elements surround a third group of radiating elements.

13. An RFID antenna comprising an array of radiating elements having a feed network to the antenna array configured so that, when driven, an asymmetric arrangement of a first group of radiating elements is driven with a first polarization and, simultaneously, a second group of radiating elements is driven with a second polarization, different to the first polarization.

14. The RFID antenna as claimed in claim 13 wherein the second group of radiating elements is arranged in an asymmetric arrangement.

15. The RFID antenna as claimed in claim 13 wherein each the asymmetric arrangement is generally L shaped.

16. The RFID antenna as claimed in claim 13 wherein phase delay elements are provided in feeds between radiating elements to produce beam tilt.

17. The RFID antenna as claimed in claim 16 wherein the beam tilt is between 15° to 25° with respect to the vertical.

18. The RFID antenna as claimed in claim 13 wherein the radiating elements of one group of radiating elements are driven to produce vertical polarization and the those of the other group are driven to produce horizontal polarization.

19. The RFID antenna as claimed in claim 13 wherein the first and second groups of radiating elements produce a far field beam having a slant polarization of between 15 to 45 degrees to the vertical.

* * * * *